US005506747A

United States Patent [19]
Bain

[11] Patent Number: 5,506,747
[45] Date of Patent: Apr. 9, 1996

[54] PROVISION OF FIFO BUFFER IN RAM

[75] Inventor: Peter D. Bain, Ottawa, Canada

[73] Assignee: Northern Telecom Limited, Montreal, Canada

[21] Appl. No.: 356,813

[22] Filed: Dec. 15, 1994

[51] Int. Cl.$^6$ .................................................. G11C 13/00
[52] U.S. Cl. .............................. 365/230.03; 365/230.01; 365/230.09
[58] Field of Search ........................... 365/20 V, 189.01, 365/189.02, 189.04, 230.01, 230.03, 230.09

[56] References Cited

U.S. PATENT DOCUMENTS 5,329,629 7/1994 Horst et al. ..................... 365/230.03

*Primary Examiner*—Terrell W. Fears
*Attorney, Agent, or Firm*—R. John Haley

[57] ABSTRACT

FIFOs having various depths are provided in a RAM in a plurality of groups. For each group, stored numbers B and D determine a base address $2^B$ in the RAM for the group and a depth $2^D$ of each FIFO in the group. Each FIFO is identified by a respective FIFO identity having a most significant "1" bit whose position identifies the respective group of FIFOs, less significant bits identifying the respective FIFO in the group. A count C is provided which is common to all of the FIFOs for identifying a respective location in each FIFO. Each FIFO in the RAM is addressed with an address comprising a sum of the base address $2^B$, a product of said less significant bits multiplied by $2^D$, and a number C mod $2^D$, using the stored numbers B and D determined by the respective FIFO identity. The sum can be provided by an OR function.

6 Claims, 1 Drawing Sheet

PROVISION OF FIFO BUFFER IN RAM

This invention relates to the provision of FIFO (first-in, first-out) buffers, referred to for convenience simply as FIFOs, in RAM (random access memory). The invention is particularly concerned with an addressing arrangement which enables a RAM to be used to provide many FIFOs of variable sizes.

BACKGROUND OF THE INVENTION

It is known to use a RAM to provide the functions of one or more FIFOs for buffering signals between an isochronous (constant rate) source or sink and an asynchronous (variable rate) sink or source. For example, in a communications system speech or data signals may be supplied from a tdm (time division multiplex) bus, at a constant rate of one byte in each frame for each channel, being written into a FIFO for the respective channel at this rate, and may be read asynchronously from the FIFO under the control of a processor. The size, or depth, of the FIFO may be one or more bytes, depending on the system and the sensitivity of the signals to delay. Conversely, the signals may be written asynchronously into the FIFOs and read isochronously from the FIFOs. As these two arrangements are equivalent, only the former is described further below, it being understood that corresponding comments apply equally to the latter.

For addressing the RAM to store the isochronous signals in the appropriate FIFOs, it is necessary to provide control hardware, desirably in the form of an integrated circuit. To this end, it is known for the control hardware to store, in registers for each FIFO, at least a base address for the location of the FIFO in the RAM, a depth of the FIFO, and a write pointer identifying the next location in the FIFO for storage of a signal. A read pointer is likewise required for reading from the FIFO.

For a large number of FIFOs and a large RAM, the storage required for the control hardware becomes considerable and inconvenient to provide in an integrated circuit. For example, for writing into 1024 FIFOs each up to 1024 bytes deep in a 1 Mbyte RAM, each FIFO requires 20 bits for the base address, 10 bits for the read pointer, and 10 bits for the FIFO depth, so that the control hardware requires a total storage capacity of 40K bits. This requires a large area of an integrated circuit, consumes a lot of power, operates relatively slowly because of the memory accesses which are required, and necessitates a long time for testing.

An object of this invention is to provide an improved arrangement for providing FIFOs in RAM, which allows many FIFOs of variable sizes to be provided without the above disadvantages of the prior art.

SUMMARY OF THE INVENTION

According to one aspect of this invention there is provided an addressing arrangement for a RAM (random access memory) for providing a plurality of FIFOs (first in, first out buffers) each identified by a respective FIFO identity having M bits, where M is a positive integer greater than one, comprising: M registers each for storing a number B and a number D, B and D each being zero or a positive integer, each number B determining a base address $2^B$ in the RAM for a respective group of FIFOs and the corresponding number D determining a depth $2^D$ of each FIFO in the respective group; a priority encoder responsive to a position of a most significant "1" bit in a FIFO identity F for selecting a respective one of the M registers; a mask unit arranged to produce a binary number G equal to the FIFO identity F with the most significant "1" bit zeroed; a shifter responsive to the number D from the selected register to shift the binary number G left by D binary digits thereby to produce a product $G.2^D$; a decoder responsive to the number B from the selected register to produce the base address $2^B$; and an adder arranged to add the product $G.2^D$ and the base address $2^B$ to provide a FIFO address for the RAM.

The arrangement preferably includes a mask unit responsive to a count C which is common to the plurality of FIFOs and responsive to the number D from the selected register to produce a number C mod $2^D$ identifying a location in the FIFO having the FIFO identity F, the adder being arranged to add the number C mod $2^D$ with the product $G.2^D$ and the base address $2^B$ to provide an address for the RAM.

The addressing arrangement of the invention enables many FIFOs of various sizes or depths to be provided in a RAM, with very little storage requirement.

With appropriate organization in the RAM of the numbers and sizes of the FIFOs in the respective groups, the adder can simply comprise an OR function, such as an OR gate or a wired-OR connection for each bit position of the RAM address.

Another aspect of this invention provides a method of providing a plurality of FIFOs (first in, first out buffers) having various depths in a RAM (random access memory), comprising the steps of: for each of a plurality of groups of FIFOs, storing a number B which determines a base address $2^B$ in the RAM for the respective group of FIFOs and storing a number D which determines a depth $2^D$ of each FIFO in the respective group, B and D each being zero or a positive integer; identifying each FIFO by a respective FIFO identity having a most significant "1" bit whose position in the FIFO identity identifies the respective group of FIFOs, less significant bits of the FIFO identity identifying the respective FIFO in the group; and addressing each FIFO in the RAM with an address including a sum of the base address $2^B$ and a product of said less significant bits multiplied by $2^D$, using the stored numbers B and D determined by the respective FIFO identity.

The method preferably includes the step of providing a count C which is common to the plurality of FIFOs for identifying a respective location in each FIFO, wherein the addressing step comprises addressing the RAM with an address comprising the sum of the base address $2^B$, the product of said less significant bits multiplied by $2^D$, and a number C mod $2^D$, using the stored numbers B and D determined by the respective FIFO identity.

BRIEF DESCRIPTION OF THE DRAWINGS

The invention will be further understood from the following description with reference to the accompanying drawing, in which.

DETAILED DESCRIPTION

Figure 1:
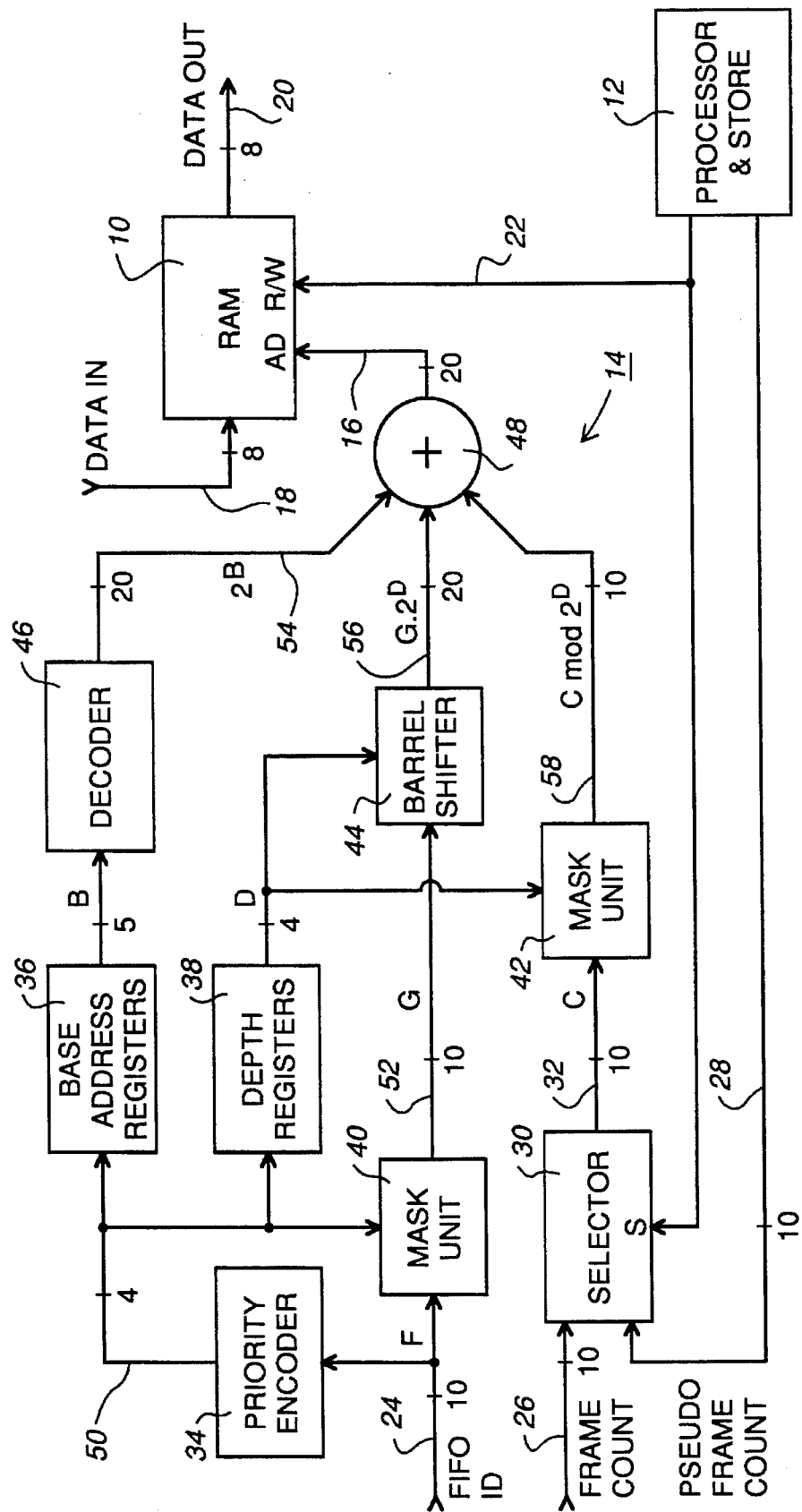
FIG. 1 illustrates a block diagram of a RAM and addressing arrangement which can provide a large number of FIFOs of variable sizes in accordance with an embodiment of the invention.

In FIG. 1, multiple-line paths are designated in conventional manner by a single line with a bar and an adjacent number indicating the actual number of lines. These numbers are given purely by way of example, and the invention is not limited in any way in this respect.

FIG. 1 illustrates a RAM 10, a processor and store unit 12, and an addressing arrangement 14 for addressing the RAM via an address path 16 to a RAM address input AD. Data from an input path 18 is written into the RAM 10, and data is read from the RAM 10 to an output path 20, 8 bits or one byte at a time, under the control of a R/W (read/write) signal supplied by the processor on a line 22.

In the illustration of FIG. 1 it is assumed for convenience that input data on the path 18 occurs isochronously, and that each byte of input is to be stored in a respective FIFO at a location in the RAM 10 which is identified as described in detail below by a FIFO ID (identity) F which is supplied on a path 24 and a frame count which is supplied on a path 26, and that data is to be read from the FIFOs asynchronously under the control of the processor using FIFO ID supplied on the path 24 and a pseudo frame count supplied from the processor and store unit 12 on a path 28. The addressing arrangement 14 includes a selector 30 having a selection control input S connected to the line 22 for selecting either the frame count from the path 26 or the pseudo frame count on the path 28 to constitute a count C on a path 32.

However, it should be appreciated that a converse arrangement, in which data is written into the RAM FIFOs asynchronously and is read from the RAM FIFOs isochronously, may equally be provided. Furthermore, it should be appreciated that the illustration of the selector 30 is purely for convenience of description of the addressing arrangement and to show that the same addressing functions are used for both writing into and reading from the RAM 10; in practice the physical arrangements for writing into and reading from the RAM may be different from one another.

The FIFO ID F is a binary number comprising M bits, enabling up to $2^M-1$ FIFOs to be provided in the RAM 10 (an all-zeros FIFO ID is not used). The FIFOs can have different depths each of the form $2^N$ where N is zero or a positive integer. In this example M=10, so that there can be 1023 FIFOs in the RAM 10, and consequently the path 24 comprises 10 lines. Also in this example the FIFOs can have various depths of 1, 2, 4, 8, ... 1024 bytes, i.e. depths of the form $2^N$ with N=0 to M. The count C is used as described below to identify individual locations in the FIFOs, and thus must be sufficient to identify any location in the deepest FIFO. Thus in this example the count C is a number from 0 to 1023, and consequently the paths 26, 28, and 32 also each comprise 10 lines. The RAM 10 can conveniently comprise a 1 Mbyte static RAM, with the address path 16 comprising 20 lines as shown in FIG. 1. A smaller size of RAM can be used for efficiently accommodating smaller numbers and/or sizes of FIFOs.

The addressing arrangement 14 comprises a priority encoder 34, M (in this case 10) 5-bit base address registers 36, M 4-bit depth registers 38, two mask units 40 and 42, a barrel shifter 44, a decoder 46, and an adder 48. These units are connected and operate as described below.

The priority encoder 34 is a 10-bit to 4-bit encoder (generally, an M-bit to P-bit encoder, where P is the smallest integer which is greater than or equal to $\log_2 M$) whose inputs are supplied with the FIFO ID F from the 10-bit path 24. The 4-bit output of the priority encoder is a binary number representing the bit position of the most significant "1" bit in the FIFO ID F. For example, if the FIFO ID F is the 10-bit number 00 1100 1101, then the most significant "1" bit is in bit position 7 (counting the least significant bit position as zero), and accordingly the output of the priority encoder 34 is the 4-bit number 0111 representing the decimal number 7. It is observed that priority encoders operating in this manner are well-known logic circuits which do not require further description here.

The 4-bit output of the priority encoder 34 is supplied on a path 50 to select a respective one of the ten base address registers 36 and a respective one of the ten depth registers 38 (in the above example, register 7 of registers numbered 0 to 9 in each case). The 4-bit output of the priority encoder 34 is also supplied from the path 50 to a control input of the mask unit 40, which is also supplied with the FIFO ID F from the path 24. The mask unit 40 comprises logic circuitry which changes the most significant "1" bit in the FIFO ID F to a "0" bit, thereby producing at its output a 10-bit masked ID G on a path 52. Thus in the above example where F is 00 1100 1101, the masked ID G is the 10-bit number 00 0100 1101.

Each of the ten base address registers 36 stores a 5-bit number B (from 0 to decimal 19) which determines the base address in the RAM 10 of a group of (one or more) FIFOs all having the same depth, this depth being determined by a 4-bit number D (from 0 to decimal 10) in the corresponding one of the ten depth registers 38. The base address and the depth are both limited to being integer powers of 2, the base address in the RAM 10 being $2^B$, and the depth of each FIFO in the group of FIFOs with this base address being $2^D$. This is described in more detail below using a simple example.

From the above description, it can be seen that the FIFO ID F identifies by the position of its most significant "1" bit a group of FIFOs in the RAM 10 whose common base address and depth are determined by the numbers B and D stored in a respective one of the registers 36 and 38. A particular one of the FIFOs in the group is identified by the remaining bits of the FIFO ID F after the most significant "1" bit, and hence by the masked ID G. The RAM address of the particular FIFO is the base address plus an offset by the number. (counting from 0) of the particular FIFO in the group multiplied by the depth of the FIFOs in the group. Thus this FIFO address is $2^B + G \cdot 2^D$.

Particular locations in all of the FIFOs are identified by the count C, which for writing into the RAM 10 is constituted by the frame count on the path 26 selected by the selector 30. In this example the count C cycles from 0 to 1023 (the depth of the deepest FIFO being 1024 bytes). For any particular FIFO with the depth $2^D$, a location offset from the FIFO address for each location in the FIFO is given by the number $C \bmod 2^D$.

The decoder 46 is a 5-bit to 20-bit decoder which produces the 20-bit base address $2^B$ on a path 54 from the 5-bit number B. It can be seen that the base address on the path 54 has the form of a 20-bit binary number with a single "1" bit preceded by (19-B) "0" bits and followed by B "0" bits.

The barrel shifter 44 is supplied with the masked ID G from the path 52 and with the number D from the respective one of the depth registers 38, and serves to left-shift the binary number G by D positions, filling the resulting D least significant bit positions with binary zeros, thereby to multiply G by $2^D$ to produce the product $G \cdot 2^D$ as a 20-bit binary number on a path 56.

The mask unit 42 is supplied with the count C from the path 32 and with the number D from the respective one of the depth registers 38, and comprises logic circuitry which zeros all but the D least significant bits of the count C thereby to produce the location offset $C \bmod 2^D$ as a 10-bit binary number on a path 58.

The adder 48 is supplied with the numbers from the paths 54, 56, and 58 and serves to add these to produce the sum $2^B + G \cdot 2^D + C \bmod 2^D$, constituting the address of a location in the RAM 10, on the path 16. It can be seen that, because of the simple forms of the numbers from the paths 54, 56, and 58, the adder 48 need not be a full binary adder but can be much simpler than this. Indeed, the number of FIFOs in each group having the same base address, and the depth of the FIFOs, can be selected so that the adder 48 can be constituted by an OR function or a wired-OR connection of the lines of the paths 54, 56, and 58.

As indicated above, reading from the RAM FIFOs is carried out under the control of the processor and store unit 12, which supplies a read control signal on the line 22 which also controls the selector 30 to supply a pseudo frame count from the path 28 as the count C on the path 32. The processor and store unit 12 supplies the pseudo frame count to the path 28, and a FIFO ID on the path 26, these being used to address locations in the FIFOs in the RAM 10 in a similar manner to that described above.

As described above, the frame count on the path 26 enables only one byte per tdm frame to be stored in each FIFO in the RAM 10. In the event that any channel requires storage of a plurality of bytes per frame, then this channel is assigned a like plurality of FIFOs all of the same depth, into each of which a respective one of the plurality of bytes is written in each tdm frame. Similarly, these FIFOs are read from in turn to supply the stored data on the output data path 20.

It should be appreciated from the above description that all of the elements 34 to 48 of the addressing arrangement 14 are relatively simple to provide in an integrated circuit. In particular, it is observed that the registers 36 and 38 require a total of only 90 bits of storage for the case of M=10 as described above, much less than is required in the prior art. Although for the asynchronous reading from the RAM an individual pseudo frame count of up to 10 bits is required for each FIFO, just as in the prior art a read pointer is required for asynchronous reading from the FIFOs, this can be stored in the processor and store unit 12 and loaded into a separate register as required for the asynchronous reading, so that this does not impose a restriction on the RAM control hardware itself.

The following table shows part of a simple example providing a number of FIFOs of various sizes in a RAM in the manner described above.

| Reg. # | Base Address B | $2^B$ | Depth D | $2^D$ | FIFO ID F Dec. | FIFO ID F Binary | G Dec. | Address Range From | Address Range To |
|---|---|---|---|---|---|---|---|---|---|
| 0 | 0 | 1 | 0 | 1 | 1 | 000001 | 0 | 1 | 1 |
| 1 | 1 | 2 | 0 | 1 | 2 | 000010 | 0 | 2 | 2 |
|   |   |   |   |   | 3 | 000011 | 1 | 3 | 3 |
| 2 | 2 | 4 | 3 | 8 | 4 | 000100 | 0 | 4 | 11 |
|   |   |   |   |   | 5 | 000101 | 1 | 12 | 19 |
|   |   |   |   |   | 6 | 000110 | 2 | 20 | 27 |
| 3 | 5 | 32 | 4 | 16 | 8 | 001000 | 0 | 32 | 47 |
|   |   |   |   |   | 9 | 001001 | 1 | 48 | 63 |
|   |   |   |   |   | 10 | 001010 | 2 | 64 | 79 |
|   |   |   |   |   | 11 | 001011 | 3 | 80 | 95 |
|   |   |   |   |   | 12 | 001100 | 4 | 96 | 111 |
|   |   |   |   |   | 13 | 001101 | 5 | 122 | 127 |
| 4 | 7 | 128 | 7 | 128 | 16 | 010000 | 0 | 128 | 255 |
|   |   |   |   |   | 17 | 010001 | 1 | 256 | 383 |
|   |   |   |   |   | etc. |   |   |   |   |

As this example shows, the FIFO ID F=1 identifies, via the registers 36 and 38 numbered zero (because the most significant "1" bit of F is in the zero bit position), a FIFO which is one byte deep and is at the RAM address 1. The FIFO IDs F=2 and 3 identify, via the registers 36 and 38 numbered one, two FIFOs which are each one byte deep and are at the RAM addresses 2 and 3 respectively. The FIFO IDs F=4, 5, and 6 identify, via the registers 36 and 38 numbered two, three FIFOs which are each eight bytes deep and start at the RAM addresses 4, 12, and 20 respectively. The FIFO ID F=7 is not used, and the RAM addresses from 28 to 31 are not used. The FIFO IDs F=8 to 13 identify via the registers 36 and 38 numbered three, six FIFOs which are each 16 bytes deep and start at the RAM addresses 32, 48, 64, 80, 96, and 112 respectively. The FIFO IDs F=14 and 15 are not used. FIFO IDs starting at F=16 identify, via the registers 36 and 38 numbered four, FIFOs each of which is 128 bytes deep, starting at the RAM address 128, and so on.

As can be seen from this example and the above description, the arrangement of the invention requires that the FIFO depths be of the form $2^N$ where N is zero or a positive integer, and change only at FIFO IDs equal to an integer power of 2 and at RAM addresses which are an integer power of 2. These requirements are minor in practice.

Although a particular embodiment of the invention has been described in detail, it should be appreciated that numerous modifications, variations, and adaptations may be made without departing from the scope of the invention as defined in the claims. In particular, the invention is equally applicable to other RAM, FIFO ID, and count sizes.

What is claimed is:

1. An addressing arrangement for a RAM (random access memory) for providing a plurality of FIFOs (first in, first out buffers) each identified by a respective FIFO identity having M bits, where M is a positive integer greater than one, comprising:

M registers each for storing a number B and a number D, B and D each being zero or a positive integer, each number B determining a base address $2^B$ in the RAM for a respective group of FIFOs and the corresponding number D determining a depth $2^D$ of each FIFO in the respective group;

a priority encoder responsive to a position of a most significant "1" bit in a FIFO identity F for selecting a respective one of the M registers;

a mask unit arranged to produce a binary number G equal to the FIFO identity F with the most significant "1" bit zeroed;

a shifter responsive to the number D from the selected register to shift the binary number G left by D binary digits thereby to produce a product $G.2^D$;

a decoder responsive to the number B from the selected register to produce the base address $2^B$; and an adder arranged to add the product $G.2^D$ and the base address $2^B$ to provide a FIFO address for the RAM.

2. An addressing arrangement as claimed in claim 1 wherein the adder comprises an OR function.

3. An addressing arrangement as claimed in claim 1 and including a mask unit responsive to a count C which is common to the plurality of FIFOs and responsive to the number D from the selected register to produce a number C mod $2^D$ identifying a location in the FIFO having the FIFO identity F, the adder being arranged to add the number C mod $2^D$ with the product $G.2^D$ and the base address $2^B$ to provide an address for the RAM.

4. An addressing arrangement as claimed in claim 3 wherein the adder comprises an OR function.

5. A method of providing a plurality of FIFOs (first in, first out buffers) having various depths in a RAM (random access memory), comprising the steps of:

for each of a plurality of groups of FIFOs, storing a number B which determines a base address $2^B$ in the RAM for the respective group of FIFOs and storing a number D which determines a depth $2^D$ of each FIFO in the respective group, B and D each being zero or a positive integer;

identifying each FIFO by a respective FIFO identity having a most significant "1" bit whose position in the FIFO identity identifies the respective group of FIFOs, less significant bits of the FIFO identity identifying the respective FIFO in the group; and addressing each FIFO in the RAM with an address including a sum of the base address $2^B$ and a product of said less significant bits multiplied by $2^D$, using the stored numbers B and D determined by the respective FIFO identity.

6. A method as claimed in claim 5 and including the step of providing a count C which is common to the plurality of FIFOs for identifying a respective location in each FIFO, wherein the addressing step comprises addressing the RAM with an address comprising the sum of the base address $2^B$, the product of said less significant bits multiplied by $2^D$, and a number C mod $2^D$, using the stored numbers B and D determined by the respective FIFO identity.

* * * * *